United States Patent [19]

Mauri

[11] Patent Number: 4,719,147

[45] Date of Patent: Jan. 12, 1988

[54] COUPLED PACKAGING SHEETS IMPERMEABLE TO GASES AND VAPORS AND BASED ON POLYOLEFINIC FILMS

[75] Inventor: Luigi Mauri, Terni, Italy

[73] Assignee: Moplefan S.p.A., Milan, Italy

[21] Appl. No.: 897,809

[22] Filed: Aug. 19, 1986

Related U.S. Application Data

[63] Continuation of Ser. No. 707,833, Mar. 4, 1985, abandoned, which is a continuation of Ser. No. 444,516, Nov. 26, 1982, abandoned.

[30] Foreign Application Priority Data

Nov. 26, 1981 [IT]  Italy ................................ 25289 A/81

[51] Int. Cl.$^4$ ............................................. B32B 15/08
[52] U.S. Cl. ..................................... 428/336; 427/35; 428/461; 428/463; 428/518
[58] Field of Search ............... 428/518, 463, 461, 336; 156/244.11; 427/35

[56] References Cited

U.S. PATENT DOCUMENTS

| | | | |
|---|---|---|---|
| 4,211,811 | 1/1981 | Montedison | 428/35 |
| 4,261,473 | 4/1981 | Yamada et al. | 428/518 |
| 4,578,294 | 3/1986 | Ouchi et al. | 428/35 |

Primary Examiner—Edith Buffalow
Attorney, Agent, or Firm—Stevens, Davis, Miller & Mosher

[57] ABSTRACT

There are disclosed coupled packaging sheets which are impermeable to gases and vapors and consist of two polyolefinic films coupled together, at least one being an oriented polypropylene film and at least one of the two films being coated with a lacquer which acts as a barrier to gases and vapors, and which is metallized on the face in contact with the other film.

The present invention provides coupled sheets or films based on films of olefinic polymers, showing improved characteristics of impermeability to gases and vapors and which are particularly suited for the manufacture of containers, envelopes, bags, vessels and, in general, manufactured articles intended prevailingly for the packaging industry.

18 Claims, No Drawings

COUPLED PACKAGING SHEETS IMPERMEABLE TO GASES AND VAPORS AND BASED ON POLYOLEFINIC FILMS

This is a continuation of application Ser. No. 707,833, filed Mar. 4, 1985 which in turn is a continuation of Ser. No. 444,516 filed Nov. 26, 1982 and now abandoned.

BACKGROUND OF THE INVENTION

As is generally known, the materials destined to be used as packaging are required to exhibit various characteristics, mechanical, aesthetic, impermeability and thermoweldability, as well as other characteristics that are difficult to find together at the same time in the films obtained from a single type of polymer.

For this reason, in general there are used coupled films obtained by combining together a plurality of films of different substances. Thus, for instance, there are known coupled films and laminates of polyolefinic films coupled to other thermoplastic polymers and/or to metal sheets such as aluminum foils.

Also known are coupled films consisting of oriented polypropylene films combined with non-oriented films obtained by extrusion of mixtures or blends of polypropylene with polyethylene or with crystalline ethylene-propylene copolymers.

U.S. Pat. No. 4,211,811, assigned to Montedison S.p.A., describes and claims coupled films consisting of two polyolefinic films of which one is an oriented polypropylene film and at least one of the two films is metallized on the face in contact with the other film.

The coupled films thus obtained, although displaying excellent mechanical and physical-mechanical characteristics such as resistance to perforation, thermoweldability, resistance of the weld, etc., have an impermeability to gases and vapors which is not altogether satisfactory for applications in which there is required a very high degree of impermeability.

Thus, an object of the present invention is to provide coupled films or sheets based on polyolefinic films which, besides maintaining unaltered the mechanical and physical-mechanical characteristics typical for these coupled films, also have a high resistance to the diffusion of gases and vapors.

It has now been found that this and other objects that will appear more clearly hereinafter are achieved by a coupled film consisting of two films of olefinic polymers, coupled together by means of the interposition, or not, of an adhesive, of which films at least one is an oriented polypropylene film and at least one of the two films is coated with a lacquer acting as a barrier to gases and vapors and which is metallized on the side or face in contact with the other film.

The oriented film is obtained by the extrusion and stretching of polypropylene prevailingly consisting of isotactic macromolecules, and having a melt index comprised between 0.5 and 5.

The other film may be a non-oriented film obtained by the extrusion of polypropylene, polyethylene, crystalline propylene-ethylene copolymers prevailingly containing propylene, either of the random or of the block type, mixtures or blends of polyethylene or polypropylene with each other or with the propylene-ethylene copolymers or with other polymers such as, for instance, ethylene-vinyl-acetate copolymers.

To the polymers, copolymers or mixtures of polymers there may be additioned, before the film extrusion, known additives such as: dulling agents, stabilizers, lubricants, fillers, pigments, etc.

The non-oriented film may also be a bioriented polypropylene film, provided it has been made weldable either by co-extrusion or by lacquering.

For the preparation of the non-oriented film, the polypropylene used has a melt index preferably comprised between 0.5 and 20; the polyethylene a melt index of between 0.5 and 15; and the ethylene-propylene copolymers a melt index between 7 and 20.

The content in ethylene of the copolymers is preferably comprised between 0.1 and 15% by weight.

In the mixtures or blends, the polyethylene or the copolymers are used in a proportion of 1–50% by weight on the total weight of the mixture.

The thickness of the polyolefinic films used in carrying out this invention is comprised between 10 and 100 microns. The lacquer acting as a barrier to gases and vapors may consist of any polymers or copolymers and mixtures of polymers having such a property.

Particularly satisfactory results have been obtained by using, as lacquer, vinylidene copolymers having a content in vinylidene units greater than 75% by weight or mixtures of polymers based on polyvinyl alcohol of medium or high degree of hydrolysis.

Among the particularly useful vinylidene copolymers are vinylidene chloride-acrylonitrile copolymers and vinylidene chloride-methyl-methacrylate copolymers. Among the polyvinyl alcohol-based mixtures which are particularly suitable are those containing alkyleneimine polymers such as polyethyleneimine, polypropyleneimine and the like.

The lacquer may be applied on the oriented film pretreated with continuous and non-perforating electrical discharges or treated by flame or with other systems (for instance, by chemical oxidation). Said lacquer may be applied also on non-stretched film, or on a film stretched in only one direction, in which latter case the stretch or stretches may be carried out before the coating.

The lacquer may be indifferently applied either on one or on both faces of the polypropylenic film, and may be applied according to known methods, from solutions nor dispersions of the polymer or copolymer or mixture of these, in water or organic solvents, by spraying, spreading, immersion or the like. The total thickness of the lacquer coating may vary from 1 to 20 microns.

The metallization is carried out under vacuum, before or after the lacquering, with metals such as: aluminum, zinc, gold, palladium or cadmium. If the metallization is carried out before lacquering, the film will preferably first be subjected to a treatment with electrical non-perforating discharges, or to the action of an oxidizing flame or to the action of chemical oxidizing systems, thereafter being coated with a primer, according to known techniques.

For packaging purposes aluminum is the most suitable and most economical metal for effecting the metallization.

The thickness of the metal layer is such as to ensure a superficial resistivity comprised between 1 and 5 Ohm.

The metallized film, coated with the lacquer having the capacity to bar the passage of gases and vapors, may be printed with inks and this printing may be carried out either before or after the lacquering.

The coupled films, in general, are prepared by lamination of the two films together, with or without the interposition between the films of adhesives, by passing them between rollers heated to a temperature comprised between 30° C. and 90° C.

The coupling of the two films without the interposition of adhesives, as well as the coating of one of the films with one thermowelding layer, may be carried out also according to the extrusion-coating method.

When adhesives are used, these are applied on one face of the films, according to known methods, particularly by smearing, starting from their solutions or dispersions in water or in organic solvents. Hot-metals may be used as adhesives. In general there are used adhesive solutions that will have a concentration comprised between 5% and 40% by weight, so as to have a quantity of adhesive on the film comprised between 1 and 10 g/m² of film surface.

The adhesives which have proved to be particularly suitable are the synthetic adhesives consisting of thermoplastic resins such as cellulosic esters and ethers, alkyl and acrylic esters, polyamides, polyurethanes, polyesters, or consisting of thermosetting resins such as epoxy resins, urea/formaldehyde resins, phenol-formaldehyde resins, melamine/formaldehyde resins or consisting of synthetic rubbers.

As solvents of the adhesive there are used, in particular, hydrocarbons such as ligroin and toluene, esters such as ethyl acetate or ketones such as acetone and methylethylketone.

The coupled films of the present invention are particularly suitable for packaging foodstuffs, including the packaging of products under vacuum.

In the practical embodiment of this invention, extensive changes and variations can be introduced without departing from the spirit and scope thereof.

The following examples are given to illustrate the invention without limiting the same. In the examples:

The transmittance measurements were carried out by spectroscopy.

The permeability to water vapor (steam) was measured at 25° C. according to ASTM E-96 standard.

The permeability to gases was measured at 25° C. according to ASTM D-1434 standard.

The melt index was determined according to ASTM D-1238-65T.

The resistance to welding of the coupled films was evaluated according to the so-called "peeling strength test" method, by measuring the tensile resistance of the weld by means of an Instron-type dynamometer.

The resistance to perforation of the coupled films was measured on a dynamometer of the Instron-type using a punch of 1.4 mm diameter and a 0.7 mm fillet.

EXAMPLE 1

A bioriented film was prepared by film-extrusion of a crystalline polypropylene prevailingly consisting of isotactic macromolecules, prepared by stereospecific polymerization of propylene and having a melt index of 4, a residue of the extraction with heptane of 96.5%, ashes 75 ppm, and by a longitudinal and transversal stretching of the obtained film. The film was first subjected to electrical continuous non-perforating discharges, then lacquered with a polyvinylalcohol/polyethyleneimine mixture in a proportion of 80:20 by weight, for a thickness of 0.8 g/sq.m, and was finally metallized under vacuum with aluminum until a superficial resistivity of 2 Ohm was obtained.

The thus obtained film (A) showed the following characteristics:

thickness: 25 micron,
longitudinal breaking load: 13 Kg/sq.mm,
transversal breaking load: 28 Kg/sq.mm,
longitudinal elongation: 180%,
transversal elongation: 45%,
resistance to tearing (Elmendorf): 12 g/25 micron.

A second film (B) was prepared by the film-extrusion of a low-density polyethylene having a melt-index of 2. This film was subjected to treatment with continuous non-perforating electrical discharges.

The above two films, A and B, were thereupon coupled to each other by the interposition of a polyurethane adhesive, applied in a thickness of 1.5 g/sq.m, and by passing the coupled films between rollers heated up to 60° C.

The coupled films thus obtained showed the following characteristics:

thickness: 77 micron,
transmittance: 1%,
permeability to oxygen: 2 cc/sq.m.24 h.atm.,
permeability to carbon dioxide: 6 cc/sq.m.24 h.atm.,
permeability to water: 2 g/sq.m.24h,
weldability range: 115°–125° C.,
resistance to the weld: 600 g /cm,
resistance to perforation 1200 g.

EXAMPLE 2

Example 1 was repeated, using a mixture consisting of a vinylidene-chloride/acrylonitrile copolymer in a molar ratio of 80:20, for providing film A with a lacquer coating 1.5 g.sq.m. thick.

The film was coated before lacquering with a primer consisting of polyethyleneimine.

The coupled film thus obtained showed the following characteristics:

thickness: 53 micron,
transmittance: 1%,
permeability to oxygen: 2 cc/sq.m.24 h.atm,
permeability to carbon dioxide: 8 cc/sq.m.24 h.atm,
permeability to water: 1.5 g/sq.m.24 h,
weldability range: 115°–125° C.,
resistance of the weld: 600 g/cm,
resistance to perforation: 1200 g.

EXAMPLE 3

Example 1 was repeated, using as film B a non-oriented film having a thickness of 25 micron, prepared by film extrusion of a crystalline random ethylene-propylene copolymer with an ethylene content of 2.5% by weight, a melt-index of 12 and subjected, before the coupling, to a treatment with continuous non-perforating electrical discharges.

The coupled film thus obtained showed the following characteristics:

thickness: 52 micron,
transmittance: 1%,
permeability to oxygen: 2 cc/sq.m. 24 h.atm,
permeability to carbon dioxide: 6 cc/sq.m. 24 h.atm,
permeability to water: 3 g/sq.m.24 h,
range of weldability: 135°–155° C.,
resistance of the weld: 650 g/cm,
resistance to perforation: 1300 g.

EXAMPLE 4

Following the same procedures as in Example 1, there was prepared a coupled film consisting of:
Film A:

A bioriented polypropylenic film of 27.5 micron thickness, treated with continuous non-perforating electrical discharges, printed with nitrocellulose-based inks, primed with polyethyleneimine, lacquered by coating with a 0.8 g/sq.m mixture of polyvinylalcohol/polyethyleneimine (in a ponderal ratio of 80:20) and subsequently metallized under vacuum with aluminum until attaining a superficial resistivity of 2 Ohm.

Film B:

A non-oriented film of 25 micron thickness, prepared by the extrusion of a crystalline random ethylene-propylene copolymer having an ethylene content of 3% by weight, a melt-index of 12, and subjected before the coupling to a treatment with continuous non-perforating electrical discharges.

The coupled film thus obtained showed the following characteristics:
thickness: 54 micron,
transmittance: 1%,
permeability to oxygen: 15 cc/sq.m. 24 h.atm,
permeability to carbon dioxide: 45 cc/sq.m. 24 h.atm,
permeability to water: 3 g/sq.m. 24 h,
range of weldability: 135°–155° C.,
resistance of the weld: 600 g/cm,
resistance to perforation: 1300 g.

EXAMPLE 5

A film A as in Example 1, lacquered with a vinylidenchloride-acrylonitrile copolymer in a molar ratio of 80:20, was coupled, following the procedures of Example 1, with a non-oriented film B, of 25 micron thickness, prepared by the film extrusion of a crystalline random ethylene-propylene copolymer containing 2.5% by weight of ethylene, and having a melt-index of 12.

The coupled films thus obtained showed the following characteristics:
thickness: 52 micron,
transmittance: 1%,
permeability to oxygen: 2 cc/sq.m. 24 h.atm,
permeability to carbon dioxide: 8 cc/sq.m. 24 h.atm,
permeability to water: 1 g/sq.m. 24 h.,
range of weldability: 135°–155° C.,
resistance of the weld: 650 g/cm,
resistance to perforation: 1300 g.

EXAMPLE 6

A non-oriented film B, having a thickness of 50 micron, prepared by film extrusion of a crystalline random ethylene-propylene copolymer containing 2.5% by weight of ethylene and having a melt-index of 12, was coupled, following the procedures of Example 1, with a bioriented film A obtained by the film extrusion of polypropylene prevailingly consisting of isotactic macromolecules and having a melt-index of 4, a residue after extraction with heptane of 96.5% and ashes 75 ppm, treated with continuous non-perforating electrical discharges, metallized under vacuum with aluminum (resistivity of 2 Ohms) and lacquered by coating the metallized face with 0.8 g/sq.m of an 80:20 by weight mixture of polyvinylalcohol and polyethyleneimine.

The coupled film thus obtained showed the following characteristics:
thickness: 77 micron,
transmittance: 1 %,
permeability to oxygen: 1 cc/sq.m. 24 h.atm,
permeability to carbon dioxide: 4 cc/sq.m. 24 h.atm,
permeability to water: 2 g/sq.m. 24 h.,
weldability range: 135°–155° C.,
resistance of the weld: 700 g/cm,
resistance to perforation: 1300 g.

EXAMPLE 7

Example 6 was repeated by lacquering film A on the metallized face by means of a 1.5 g/sq.m coating of a copolymer of vinylidenechloride and acrylonitrile in a molar ratio of 80:20.

The thus obtained coupled film showed the following characteristics:
thickness: 77 micron,
transmittance: 1%,
permeability to oxygen: 2 cc/sq.m. 24 h.atm,
permeability to carbon dioxide: 6 cc/sq.m. 24 h.atm,
permeability to water: 1 g/sq.m. 24 h.,
resistance of the weld: 700 g/cm,
resistance to perforation: 1300 g,
weldability range: 135°–155° C.

What is claimed is:

1. Coupled packaging films which are impermeable to gases and vapors and consist of two olefinic polymer films, at least one of which is an oriented film, coupled to each other, with or without the interposition of an adhesive, at least one of said films being coated with a lacquer acting as a barrier for gases and vapors and metallized on the face thereof in contact with the other of said films, the lacquer being selected from the group consisting of vinylidene copolymers having a content in vinylidene units greater than 75% by weight and polymeric mixtures containing polyvinyl alcohol of medium to high degree of hydrolysis.

2. Coupled films according to claim 1, characterized in that the oriented film is obtained by extrusion and stretching of polypropylene consisting prevailingly of isotactic macro-molecules and having a melt index comprised between 0.5 and 5.

3. Coupled films according to claim 1, characterized in that they consist of two olefinic polymer films coupled to each other, one of said films being an oriented film of polypropylene and the other film being a non-oriented film obtained by the extrusion of polypropylene, polyethylene, crystalline propylene-ethylene copolymers with a prevailing content in propylene, mixtures of polyethylene and polypropylene with each other or mixtures of said homopolymers with other polymers or copolymers.

4. Coupled fixtures according to claim 3, characterized in that a non-oriented film is used and obtained by extrusion of a crystalline random propylene-ethylene copolymer with a prevailing propylene content.

5. Coupled films according to claim 1, characterized in that a non-oriented film is used and obtained by extrusion of a crystalline block propylene-ethylene copolymer with a prevailing propylene content.

6. Coupled films according to claim 3, characterized in that a non-oriented film is used and obtained by extrusion of a mixture selected from the group consisting of mixtures of polypropylene or polyethylene with ethylene-propylene copolymers and mixtures of said homopolymers with ethylene-vinyl acetate copolymers.

7. Coupled films according to claim 1, characterized in that the lacquer acting as barrier to gases and vapors consists of vinylidene copolymers having a content in vinylidene units greater than 75% by weight.

8. Coupled films according to claim 7, characterized in that the vinylidene copolymer is selected from the group consisting of vinylidene chloride/acrylonitrile copolymers and vinylidene/methylmethacrylate copolymers.

9. Coupled films according to claim 1, characterized in that the lacquer acting as barrier to gases and vapors consists of a polymeric mixture containing polyvinyl-alcohol of medium or high degree of hydrolysis.

10. Coupled films according to claim 9, characterized in that the lacquer acting as barrier to gases and vapors is a polymeric mixture comprising polyvinyl-alcohol and a polyalkyleneimine.

11. Coupled films according to claim 10, in which the polyalkyleneimine of the polymeric mixture is polyethyleneimine.

12. Coupled films according to claim 10, in which the polyalkyleneimine of the polymeric mixture is polypropyleneimine.

13. Coupled films according to claim 1, characterized in that the lacquer is applied on the oriented film after pretreatment of said film by continuous, non-perforating electrical discharges, by an oxidizing flame or by a chemical oxidizing system.

14. Coupled films according to claim 1, characterized in that the thickness of the lacquer coating is comprised between 1 and 20 micron.

15. Coupled films according to claim 1, characterized in that the metallization is carried out with aluminum, under vacuum and for a thickness corresponding to a superficial resistivity comprised between 1 and 5 Ohm.

16. Coupled films according to claim 1, characterized in that the metallized film is printed with inks.

17. Coupled films according to claim 1, characterized in that the two films are coupled together by means of an adhesive selected from the group of synthetic adhesive consisting of thermoplastic resins and hot-melts.

18. Coupled films according to claim 1, characterized in that the two films are coupled together by means of extrusion coating.

* * * * *